April 8, 1952     E. J. VAGIM     2,592,083

FEED CONTROL FOR AUTOMATIC WEIGHERS

Filed July 26, 1946     2 SHEETS—SHEET 1

INVENTOR.
E. J. Vagim
BY
ATTYS

April 8, 1952           E. J. VAGIM           2,592,083
FEED CONTROL FOR AUTOMATIC WEIGHERS
Filed July 26, 1946           2 SHEETS—SHEET 2
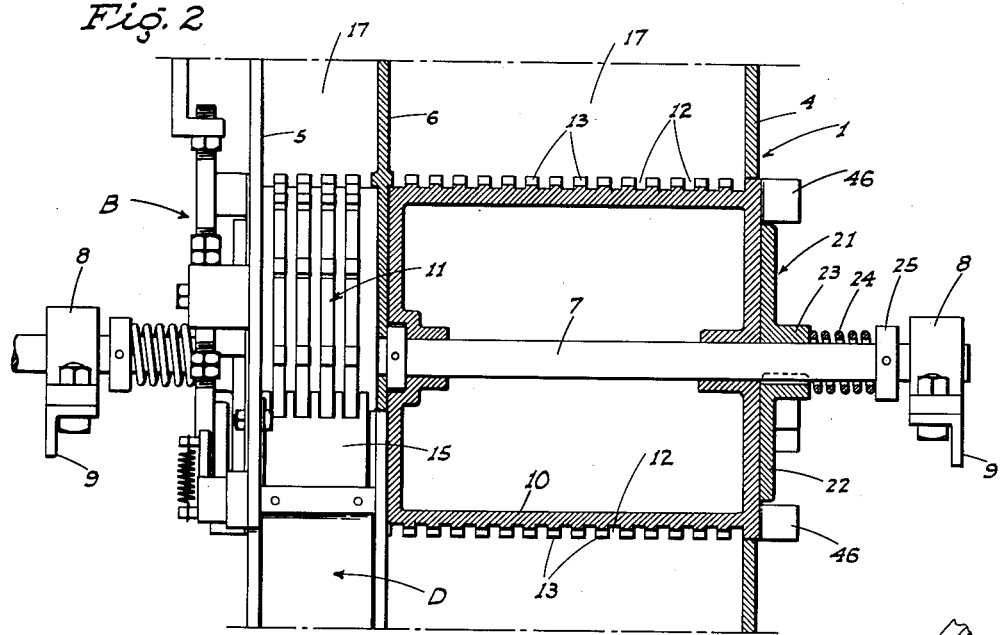
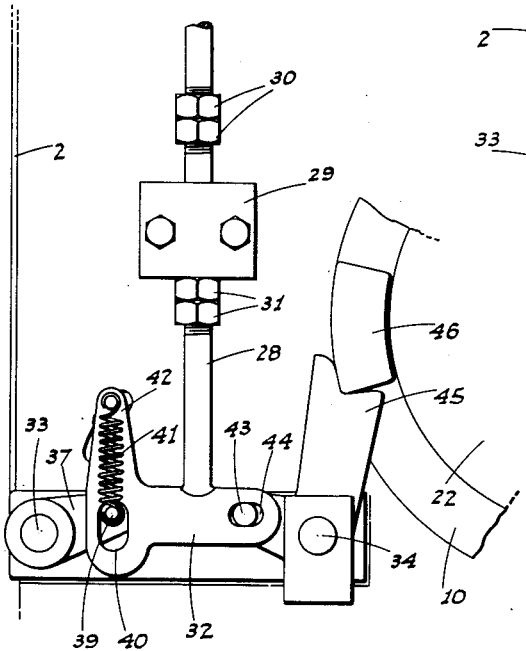
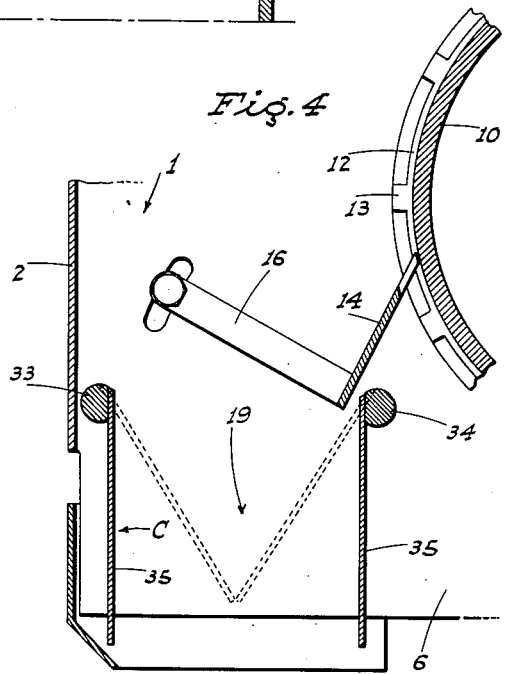
INVENTOR.
E. J. Vagim
BY
ATTYS Patented Apr. 8, 1952

2,592,083

UNITED STATES PATENT OFFICE 2,592,083

FEED CONTROL FOR AUTOMATIC WEIGHERS

Edward J. Vagim, Fresno, Calif.

Application July 26, 1946, Serial No. 686,586

1 Claim. (Cl. 249—42)

This invention is directed to, and it is an object to provide, an improved feeding mechanism for an automatic, bulk-material weighing machine. While this invention is especially designed for use in an automatic machine for weighing raisins into separate batches of an exact predetermined weight, the invention obviously may be readily adapted to other purposes.

Another object of this invention is to provide a bulk-material feeding mechanism, as in the preceding paragraph, which includes, in combination with a main feed drum and a dribble feed drum, both feeding to a common scale bucket, but through separate gates; a novel control unit associated with each drum and being independently operative to close the corresponding gate and positively but releasably latch the corresponding drum against further feeding rotation upon delivery of material of a predetermined weight to said scale bucket. The dribble feed drum is employed to feed a relatively smaller and thus more accurately regulated quantity of material to the scale bucket to bring each batch to an exact, predetermined weight after the main feed drum has been stopped and its gate closed when the batch is close to but short of said exact predetermined weight.

An additional object of the invention is to provide a bulk material feeding mechanism, as above, wherein said feed drum is driven by a friction clutch; the corresponding control unit including a solenoid actuated assembly operative to close the corresponding gate and substantially simultaneously latch the drum against rotation; the clutch then slipping until the drum is unlatched and the gate opened for a further material feed-in operation.

A further object of the invention is to provide a practical feeding mechanism, and one which will be exceedingly effective for the purpose for which it is designed.

These objects are accomplished by means of such structure and relative arrangement of parts as will fully appear by a perusal of the following specification and claim.

In the drawings:

Fig. 2 is a fragmentary front elevation of the feeding mechanism, with the main feed drum and the corresponding friction clutch in section.

Fig. 3 is a fragmentary elevation showing the main drum control unit in its gate closing and drum latching position.

Fig. 4 is a fragmentary cross section showing the relation of the main feed drum, its stripper plate, and associated gate.

Figure 1:
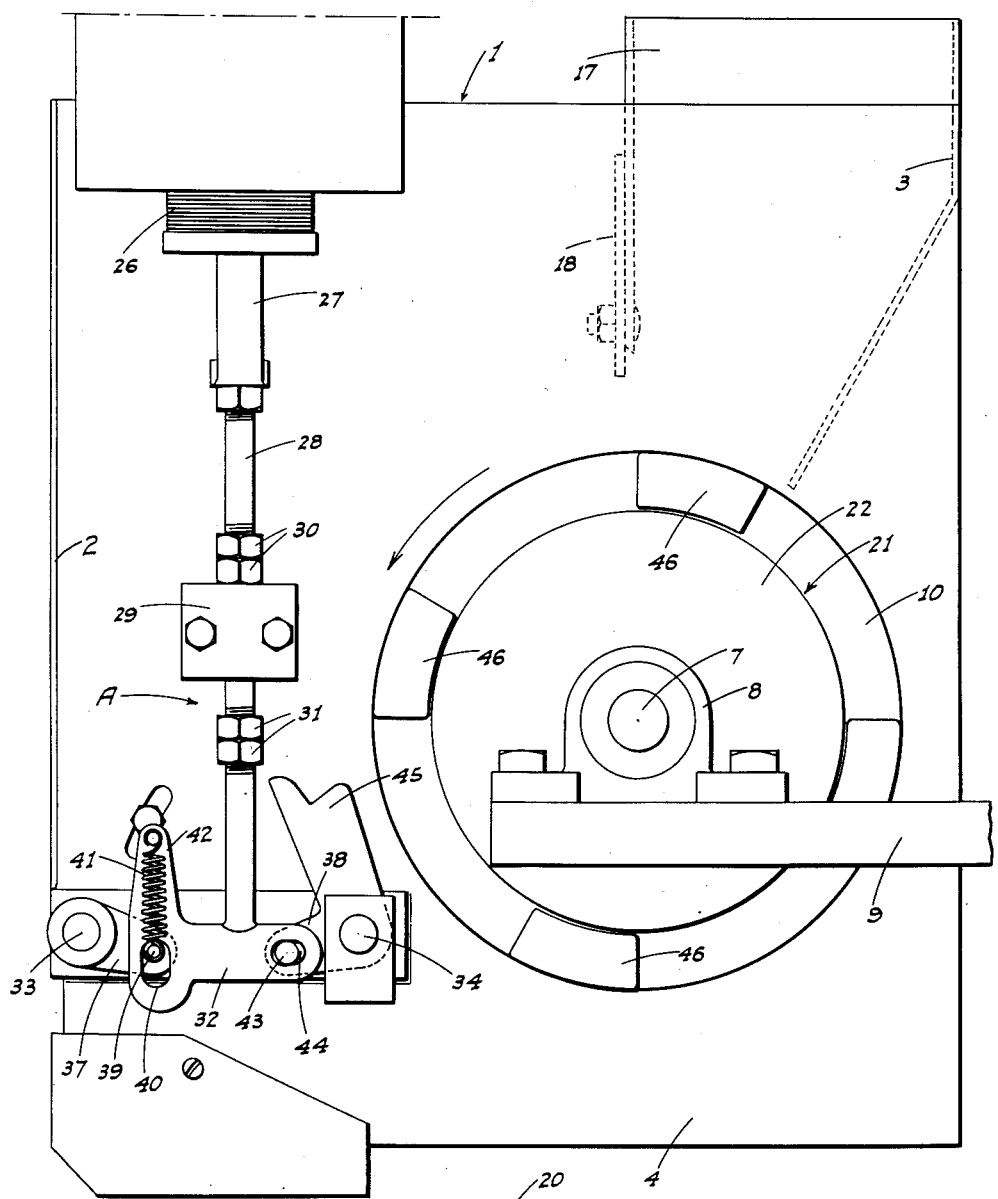
Fig. 1 is a side elevation of the feeding mechanism taken from the side adjacent the main feed drum; the corresponding control unit being in its normal or released position.

Referring now more particularly to the characters of reference on the drawings, the feeding mechanism is enclosed within a housing, indicated generally at 1, which includes a front wall 2, a back wall 3, opposite side walls 4 and 5, and an intervening parallel partition 6; the partition 6 being relatively closer to the sidewall 5 than to the sidewall 4.

A horizontal shaft 7 extends through the housing intermediate the front and back walls, and said shaft is journaled at opposite ends outside of the housing 1 in bearings 8 carried on a supporting frame 9. A main feed drum 10 is turnably mounted on the shaft 7 between the sidewall 4 and partition 6; the sidewall 4 having a circular opening therein into which the adjacent end of the main feed drum projects, so that said end of the drum is exposed from outside the housing 1. A dribble feed drum 11, of relatively short axial extent as compared to the drum 10, is rotatably mounted on the shaft 7 between the sidewall 5 and partition 6; the dribble feed drum 11 being similarly exposed, at its outer end, through an opening in the sidewall 5.

The main free feed drum 10 and the dribble feed drum 11 are circumferentially grooved, as at 12, and the resulting circumferential ribs 13, are toothed, as shown. Toothed stripper plates 14 and 15 cooperate with the drums 10 and 11, respectively, at the front thereof slightly below their horizontal center line, and said stripper plates extend at a forward and downward incline, being supported by adjustable arms 16, as shown in connection with the stripper plate 14 in Fig. 4.

Bulk material is fed to the drums 10 and 11 at the top and from above the same by means of a divided hopper 17 formed within the housing 1; said hopper having, at the front thereof, vertically adjustable flow control plates corresponding to the drums, and one of which plates is indicated at 18.

The main feed drum 10 and dribble feed drum 11, upon rotation thereof in the direction shown by the arrow in Fig. 1, feed bulk material from the hopper 17 forwardly and downwardly through corresponding chutes in the housing 1. The construction of the chutes into which the respective drums discharge is substantially identical except as to size, and a description of one will suffice as a description of the other. The chute into which the main feed drum 10 discharges is shown generally at 19 in Fig. 4. It is formed by two spaced apart normally vertically disposed gate plates 35 which are pivoted for swinging movement from their vertical position to the position shown by dotted lines in Fig. 4, as is described later. These plates are disposed forwardly of and below the horizontal center line of the drum 10 and the stripper plate 14 inclines downwardly from its position adjacent the drum to a position overhanging the innermost plate 35. Thus, with the revolution of the drum the stripper plate 14 strips the bulk material from the drum and it flows down such plate into the chute 19 formed by the gate plates 35. The co-operating gate plates 35 form a gate indicated generally at C for closing the passage through the chute when operated in the manner later described. From the chutes in the housing 1 the material drops into a scale bucket, indicated diagrammatically at 20, which scale bucket is arranged in connection with an electric control circuit (not shown) which includes one normally open circuit which closes when a given batch of the bulk material in the scale bucket approaches but is short of a predetermined exact weight, and another normally open circuit which closes when the batch in the scale bucket substantially reaches said exact predetermined weight. By reason of the control units, as hereinafter described in detail, and which are actuated by the above mentioned circuits, the main feed drum 10 and the dribble feed drum 11 are releasably latched against further rotation when the weight of the batch in the scale bucket 20 approaches but is short of said exact predetermined weight, and substantially reaches said exact predetermined weight, respectively. In this manner a batch of material in the scale bucket 20 can be brought to the exact predetermined weight without material variance; the very last portion of each batch being fed only by the dribble feed drum, whose relatively smaller quantity of feed is easier to control than would be the case if the main feed drum 10 were the sole feeding means. Additionally, a novel operating means for the gate assembly, likewise hereinafter described in detail, further assures of accuracy in the weighing operation.

The control units for the main feed drum 10 and dribble feed drum 11 are indicated at A and B, respectively, and as these units are identical in construction a description of the unit A will suffice for both. This control unit is constructed and operates as follows:

A friction drive clutch, indicated generally at 21, is employed to drive the main feed drum 10 from the shaft 7, and said clutch comprises a friction clutch plate 22 bearing in friction driving relation against the outer end of the drum 10. The plate 22 includes a hub 23 slidably splined on the shaft 7, and a compression spring 24 engaged between the hub 23 and a collar 25 fixed on the shaft normally urges the plate 22 into its driving engagement with the outer end of said drum 10. With this arrangement it will be seen that the drum 10 normally rotates with the shaft 7.

A heavy-duty solenoid 26 is mounted on the sidewall 4 above and ahead of the shaft 7, and includes a solenoid plunger 27 which depends to connection with a vertical actuating rod 28 slidable through a stop block 29. Nuts 30 and 31 on the rod 28 above and below the stop block 29 limit vertical reciprocation of said rod.

At its lower end the rod 28 is fitted with a substantially horizontal cross head 32.

Each gate plate 35 of the gate C depends from one of a pair of spaced apart turnable cross shafts 33 and 34 extending through the housing 1 ahead of and below the drum 10. Through connections with the cross head 32 these shafts are turnable to swing the gate plates 35 to their closed position, as shown by dotted lines in Fig. 4, whenever the solenoid 26 operates to raise the rod 28 and cross head 32. These connections will now be described.

At their outer ends, i. e. outwardly of the sidewall 4, the cross shafts 33 and 34 are fitted with radial levers 37 and 38 which project toward each other and toward the cross head 32. The radial lever 37 includes a laterally projecting pivot pin 39 which rides in a vertically elongated slot 40 in the adjacent end of the cross head 32; there being a tension spring 41 connected between the pivot pin 39 and the upper end of an upstanding finger 42 on the crosshead 32 above said slot 40.

Another laterally projecting pivot pin 43 extends from the radial lever 38 through a horizontal elongated slot 44 in the adjacent end of the crosshead 32.

It will be seen that upon upward motion of the rod 28 and crosshead 32, under the influence of the solenoid 26, that the radial levers 37 and 38 are swung upwardly, causing swinging movement of the gate plates 35 to their closed position.

The spring 41 normally maintains the pivot pin 39 in the upper end of the slot 40, but should any obstruction, as for example a piece of bulk material, engage between the lower edges of the gate plates 35, said spring 41 and the associated pin and slot arrangement permits the corresponding gate plate 35 to stop slightly short of its fully closed position, without any damage to the structure.

The radial lever 38, which is the one closest to the exposed end of the main feed drum 10, is formed with an upstanding latch arm 45 notched at its upper end, as shown, for engagement with any one of a plurality of evenly spaced lugs 46 which project laterally outwardly from the exposed end of drum 10 radially out with respect to the friction clutch 21. The latch arm 45 is normally clear of the lugs 46, i. e. is clear of said lugs when the actuating rod 28 and crosshead 32 are lowered, and at which time the gate C is open. The gate for the dribble feed drum 11 is indicated at D.

Each batch weighing operation of the feeding mechanism is accomplished as follows:

At the outset both the main feed drum 10 and dribble feed drum 11 rotate, whereby bulk material is delivered from the hoppers over the stripper plates 14 and 15, and through the normally open gates C and D into the scale bucket 20.

When the batch in the scale bucket 20 approaches but is somewhat short of the exact predetermined weight to which the material is being scaled, the aforementioned one circuit closes, energizing the solenoid 26 in a manner to cause the actuating rod 28 to be forcefully raised. This swings the gate plates 35 of the gate C closed, and at the same time swings the latch arm 45 into the rotative path of the lugs 46, said arm then engaging the next approaching lug and stopping rotation of the main feed drum 10. When rotation of said drum is stopped the friction clutch 21 merely slips until the drum is again unlatched for a further feeding operation.

When the gate C closes and the drum 10 stops, the main feed to the scale bucket 20 is effectively interrupted, but the relatively smaller feed from the dribble feed drum 11 continues until said exact predetermined weight of the material in the bucket 20 is reached. At this time the control unit B is actuated through the other of said aforementioned circuits, and functions in exactly the same manner as described in connection with the control unit A, so as to close the gate D, as well as simultaneously latch the dribble feed drum 11 against rotation.

After the scale bucket 20 receives a batch of exact predetermined weight it is dumped, by means which form no part of this invention, and it returns to a normal position, at which time the circuits both likewise open so that the solenoids of the control units A and B are in positions releasing said control units.

From the above it will be evident that there has been provided a feeding mechanism which is operative to deliver bulk material from a hopper to a scale bucket in exact regulated quantity by weight; this being a very desirable accomplishment in the processing of commodities, such as raisins.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and on which Letters Patent are desired:

In a material feeding mechanism which includes a continuously driven shaft, a material feeding drum turnable on the shaft, a slip clutch normally connecting the drum in driven relation with the shaft, a container below the drum, a normally open swing gate into which the drum discharges and forming a chute between the drum and container, and means responsive to a predetermined weight of material in the container operative to stop rotation of the drum and simultaneously close the gate; said weight responsive means including a turnable shaft on the swing gate, the gate depending from the shaft, a rod mounted for vertical reciprocating movement, a cross head on the rod, a solenoid effective to lift the rod when the solenoid is energized, such energization being effected in response to the said predetermined weight of material delivered into the container, a lever arm on the gate shaft, one end of the lever arm being linked to the cross head, a second lever arm pivoted adjacent the drum, a stop fixed to said second lever arm, stop lugs on the drum, the lifting of the rod being effective to cause the cross head to operate the lever arms, such operation causing the first lever arm to swing the gate to closed position and the second lever arm to swing the stop thereon into the path of one of the stop lugs on the drum; the linkage connection between the first named lever arm and said crosshead comprising a pin on said lever, the crosshead having a vertical slot in which the pin rides, and a spring between the crosshead and pin acting on the latter to normally hold the same at the top of the slot.

EDWARD J. VAGIM.

REFERENCES CITED

The following references are of record in the file of this patent:

UNITED STATES PATENTS

| Number | Name | Date |
|---|---|---|
| 247,615 | Coleman | Sept. 27, 1881 |
| 397,045 | Winchell | Jan. 29, 1889 |
| 429,857 | Loftus et al. | June 10, 1890 |
| 906,214 | Freeman | Dec. 8, 1908 |
| 1,902,145 | Slemmer | Mar. 21, 1933 |
| 1,930,159 | Crilly | Oct. 10, 1933 |
| 2,096,583 | Handy | Oct. 19, 1937 |
| 2,111,143 | Geldhof | Mar. 15, 1938 |
| 2,115,620 | Cave | Apr. 26, 1938 |
| 2,177,997 | Ripley | Oct. 31, 1939 |